United States Patent [19]

Umezawa et al.

[11] E Re. 28,647

[45] Reissued Dec. 9, 1975

[54] PREPARATION OF 3-4 DIDEOXYKANAMYCIN B ACTIVE AGAINST RESISTANT BACTERIA

[75] Inventors: Sumio Umezawa; Hamao Umezawa, both of Tokyo; Tsutomu Tsuchiya, Yokohama, all of Japan

[73] Assignee: Zaidan Hojin Biseibutsu Kagaku Kenkyu Kai, Tokyo, Japan

[22] Filed: May 1, 1974

[21] Appl. No.: 465,744

Related U.S. Patent Documents

Reissue of:

[64] Patent No.: 3,753,973
Issued: Aug. 21, 1973
Appl. No.: 149,351
Filed: June 2, 1971

[52] U.S. Cl. ..... 260/210 K; 260/210 AB; 424/181
[51] Int. Cl.[2] ..... C07H 5/06
[58] Field of Search ..... 260/210 K, 210 AB

[56] References Cited

UNITED STATES PATENTS 2,967,177 1/1961 Johnson et al. ..... 260/210 K

OTHER PUBLICATIONS

Hudson, "Advances in Carbohydrate Chem.," Vol. 8, 1953, pp. 126–127, Academic Press, New York, N.Y.
Pigman, "The Carbohydrates," 1957, Academic Press Inc., New York, N.Y., pp. 162–163.

*Primary Examiner*—Johnnie R. Brown
*Attorney, Agent, or Firm*—Brady, O'Boyle & Gates

[57] ABSTRACT

Synthesis of 3′-4′-dideoxykanamycin B which comprises protecting the amino and all or a part of the hydroxyl groups other than 3′ and 4′-hydroxyl groups of kanamycin B, sulfonylating 3′- and 4′-hydroxyl groups to give a derivative having disulfonic ester groups, removing said ester groups to give 3′-4′-unsaturated compound, reducing said compound and finally removing the residual protecting groups.

3 Claims, No Drawings

PREPARATION OF 3-4 DIDEOXYKANAMYCIN B ACTIVE AGAINST RESISTANT BACTERIA

Matter enclosed in heavy brackets [ ] appears in the original patent but forms no part of this reissue specification; matter printed in italics indicates the additions made by reissue.

This invention relates to the synthesis of 3'-4'-dideoxykanamycin B which is antibacterial and especially active against infection of kanamycin-resistant organisms. This invention is based on the findings discovered by a series of researches done by H. Umezawa et al., who cleared the mechanism of the drug-inactivation by the resistant bacteria isolated from patents and who then pursued to find, based on the mechanism, new antibiotic derivatives active against drug-resistant bacteria.

Hamao Umezawa et al. [reported in "Science," 157, 1559 (1967)] found that drug-resistant gram-negative bacteria carrying R factor of patent-origin, resistant Staphyococci and resistant Pseudomonas aeruginosa produced enzymes that inactivate kanamycin by transferring phosphate from ATP to 3'-hydroxyl group of kanamycin.

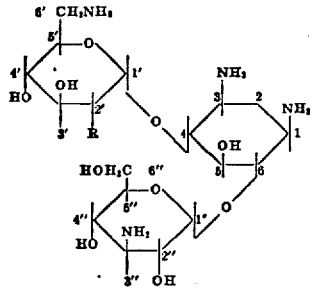

kanamycin R=OH
kanamycin BR=$NH_2$

Based on these findings, the inventors firstly attempted to block the 3'-hydroxyl group and 3'-O-methylkanamycin was synthesized; but the derivative had no antibacterial activity. 3'-deoxykanamycin was, in the next step, synthesized and it was found that the derivative had the activity against the above-described resistant bacteria. Therefore, it was roughly concluded that the replacement of the hydroxyl group, which is phosphorylated by resistant bacteria, with hydrogen will give the antibiotic a character to attack the resistant bacteria. The inventors applied the principle to kanamycin B and highly active 3',4'-dideoxykanamycin B (the formula is shown below) was prepared.

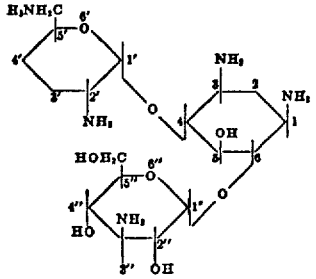

The synthetic route is as follows: Starting material kanamycin B is transformed to the kanamycin B derivative as shown in the General Formula I or I', in which five amino groups, 4'',6''-hydroxyl groups and all or a part of 5,3',4' and 2''-hydroxyl groups are protected.

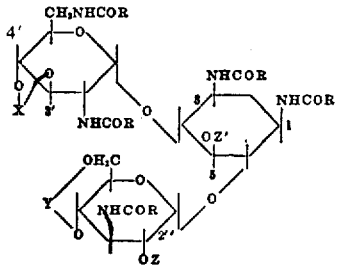

(I)

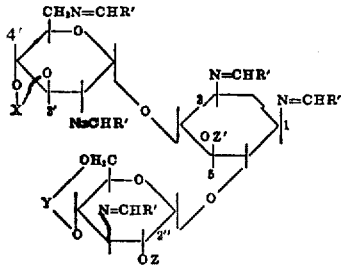

(I')

R = H, alkyl, aralkyl, aryl, alkyloxy, aralkyloxy or aryloxy group.
R' = H, alkyl, aralkyl or aryl group.
X = H, H or presented by

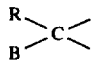

(in which A and B are respectively, H, alkyl or aryl group) or

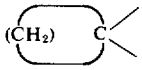

Y is represented by

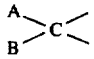

(in which A and B are, respectively, H, alkyl or aryl group) or

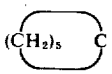

Z = H, acyl, alkyl, aralkyl, aryl group or alkylsulfonyl, aralkylsulfonyl or arylsulfonyl group,
Z' = H or acyl group.

The derivative (I) or (I') is then transformed to the derivative as shown in the General Formula II (W = H), in which 3' and 4'-hydroxyl groups are liberated, and the derivative is then transformed to the derivative

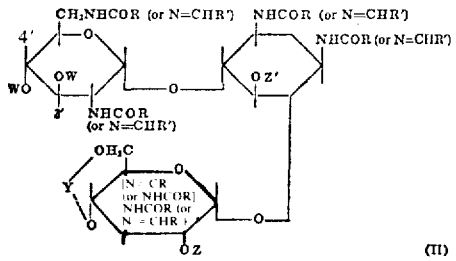

(II)

W = H, alkylsulfonyl, aralkylsulfonyl or arylsulfonyl group.

R, R', Y, Z and Z' are the same with that described in the General Formula I or I'.

; shown in the General Formula II (W = $SO_2Q$, Q:al-/l, aralkyl or aryl group, in which 3' and 4'-hydroxyl 'oups are sulfonylated. The derivative (II) (W = $O_2Q$) is then treated by the procedure described by itson et al. (Carbohydrate Research, volume 1, pages 38 to 340, 1965), i.e., treated with iodide ion and a etal powder having reducing property such as zinc ıst in an appropriate solvent giving the derivative hav-g a 3',4'-unsaturation group. The protecting groups the resulting derivative, after hydrogenation of the ısaturation group, are removed by an usual manner to ve the final product, 3',4'-dideoxykanamycin B.

The synthesized 3',4'-dideoxykanamycin B inhibits .e growth of many kinds of bacterial strains in the sim-ır order with that of kanamycin B as shown in Table and moreover inhibits the growth of strains of kana-ycin and kanamycin B resistant Staphylococci, resis-.nt Echerichia coli and resistant Pseudomonas aerugi-ɔsa. 3',4'-dideoxykanamycin B shows the therapeutic 'fect against the infections caused by Staphylococci, lebsiella pneumoniae, Salmonella typhosa dn Pseudo-onas aeruginosa in mice. 3',4'-dideoxykanamycin B ıs low toxicity ($LD_{50}$ 180 mg./kg. mouse, iv.) and ıows high blood level after the injection, thus proving ıe derivative to be a valuable chemotherapeutic agent ır treatment of many kinds of infections including ıose cause by gram-negative and gram-positive resis-nt bacteria.

It shows the strong effect in inhibiting microorgan-ms including pathogenic organism as shown below.

TABLE 1

ANTIBACTERIAL SPECTRA OF 3',4'-DIDEOXY-KANAMYCIN B AND KANAMYCIN B

| | Minimal inhibitory concentration (meg./ml.) | | |
|---|---|---|---|
| | 3',4'-dideoxykanamycin B | | |
| :st organisms[1] | Sample 1 | Sample 2 | Kanamycin B |
| *aphylococcus curcus* FDA 200 P | 1.25 | 0.78 | 0.78 |
| *'cherichia coli* NIHJ | 2.5 | 1.56 | 1.56 |
| K-12 CS-2 | 2.5 | 1.56 | 0.78 |
| K-12 ML 1629 | 2.5 | 1.56 | >50 |
| K-12 ML 1630 | 2.5 | 3.12 | >50 |
| K-12 ML 1410 | | 1.56 | 0.78 |
| *eudomoncs aeruginosa* A3 | 2.5 | 3.12 | 50 |
| No. 11 | | 3.12 | >50 |
| No. 12 | | 6.25 | 50 |
| No. 39 | | 6.25 | >50 |
| No. 45 | 1.25 | 0.78 | 25 |
| No.67 | | 6.25 | >50 |
| *'oteus rettgeri;* | | | |
| GN 311 | | 12.5 | 3.12 |
| GN 466 | 2.5 | 3.12 | 1.56 |

utrient agar, 3-°, C., 18 hours.

In the next, examples of the preparation of 3',4'-dideoxykanamycin B are shown. Since 3',4'-dideoxykanamycin B synthesized was proved effective for the remedy of a wide variety of infections, this invention is not limited to the preparations of 3',4'-dideoxykanamycin B as shown in examples, but includes all modified procedures, which are recognized as usual.

EXAMPLE 1

The synthesis of penta-N-ethoxycarbonylkanamycin B

To a stirred mixture of kanamycin B free base (1.0 g.) and anhydrous sodium carbonate (0.9 g.) in aqueous acetone (1:1, 20 ml.), ethoxycarbonyl chloride (1.05 ml.) was added and the stirring was continued for 5 hours at room temperature. Resulting precipitates were filtered, washed with water and dried to give a solid (1.46 g.), M.P. 305° (decomp.), $[\alpha]_D^{15}$+88° (c. 0.5, dimethylformamide).

EXAMPLE 2

The synthesis of penta-N-ethoxycarbonyl-3',4';4'',6''-di-O-isopropylidenekanamycin B [in general Formula I, R=$OC_2H_5$, X=Y=$CH(CH_3)_2$, Z'=H]

The penta-N-ethoxycarbonylkanamycin B (13.7 g.) prepared by the procedure described in Example 1 was dissolved in dimethylformamide (70 ml.) and the solution, after addition of 2,2-dimethoxypropane (18.8 g.) and anhydrous p-toluenesulfonic acid (0.35 g.), was heated at 65° C. for 1 hour. The resulting solution was concentrated to approximately 50 ml. and, after addition of 2,2-dimethoxypropane (30 g.), the solution was again heated at 65° C. for 1 hour. Triethylamine (6 ml.) was added and the solution was poured into a stirred mixture of benzene (50 ml.) and water (500 ml.), whereupon a solid precipitated (Solid A). After removal of the Solid A by filtration, the benzene layer was allowed to stand. The precipitates appeared were filtered, washed with benzene and water and dried to give a solid, 3.5 g., M.P. 236–237° C. $[\alpha]_D^{20}$+87° (c. 1, dimethylformamide).

The Solid A obtained (8.1 g.) was proved to be penta-N-ethoxycarbonyl-4'',6''-O-isopropylidenekanamycin B and the compound could be converted to penta- N-ethoxycarbonyl-3',4';6''-di-O-isopropylidenekanamycin B by the same treatment as described above.

EXAMPLE 3

The synthesis of 2''-O-benzoyl-penta-N-ethoxycarbonyl-3',4';4'',6''-di-O-isopropylidenekanamycin B [in general Formula I, R=$OC_2H_5$, X=Y=$CH(CH_3)_2$, Z is $COC_6H_5$ and Z' is H]

The kanamycin B derivative (3.24 g.) prepared by the procedure described in Example 2 was dissolved in pyridine (48 ml.) and to the solution, benzoyl chloride (2 g.) was added. After allowing to stand at room temperature for 1 hour, the solution was evaporated and the residue was dissolved in chloroform. The solution was washed with water, dried over sodium sulfate and concentrated to approximately 20 ml. Addition of n-hexane gave crystals, 3.35 g., M.P. 205–209° C. $[\alpha]_D^{21}$+114° (c. 1, dimethylformamide).

EXAMPLE 4

The synthesis of 2''-O-benzoyl-penta-N-ethoxycarbonyl-4'',6''-O-isopropylidenekanamycin B The kanamycin B derivative (2.82 g.) prepared by the procedure described in Example 3 was dissolved in aqueous acetic acid (1:3, 40 ml.) and the solution was heated at 95° C. for 30 minutes. The resulting solution was evaporated and the deacetonated product obtained (2.58 g.) was dissolved in dimethylformamide (15 ml.) and, after addition of 2,2-dimethoxypropane (0.65 g.) and anhydrous p-toluenesulfonic acid (55 mg.), the solution was allowed to stand at room temperature for 1 hour. The solution was poured into water and the resulting precipitates were filtered, washed with water and treated with benzene to give benzene-insoluble solid, 2.01 g., M.P. 285–287° C., $[\alpha]_D^{21}$+105° (c. 1, dimethylformamide); NMR spectrum (in dimethylsulfoxide-$d_6$): $\tau$ 8.72 and 8.60 (each 3-proton singlet assignable to isopropylidene protons), $\tau$ 1.5–2.8 (5-proton multiplet assignable to benzoyl protons).

EXAMPLE 5

The synthesis of 2''-O-benzoyl-penta-N-ethoxycarbonyl-4'',6''-O-isopropylidene-3',4'-di-O-mesyl kanamycin B [in General Formula II, R=$OC_2H_5$, Y=$CH(CH_3)_2$, W=$SO_2CH_3$, Z=$COC_6H_5$ and Z'=H]

The kenamycin B derivative (1.18 g.) prepared by the procedure described in Example 4 was dissolved in pyridine (15 ml.) and the solution, after addition of methanesulfonyl chloride ($CH_3SO_2Cl$, 0.66 g.), was allowed to stand at room temperature for 1.5 hours. The solution was concentrated to the one-third of the original volume and the solution was poured into water. Resulting precipitates were filtered and washed with water to give a solid, 1.32 g., M.P. 198° C., $[\alpha]_D^{21}$ +107° (c. 1.5, dimethylformamide); NMR spectrum (in pyridine-$d_5$): $\tau$ 6.60 and 6.45 (each 3-proton singlet assignable to mesyl protons).

EXAMPLE 6

The synthesis of 2''-O-benzoyl-3',4'-dideoxy-3',4'-didehydro-penta-N-ethoxycarbonyl-4'',6''-O-isopropylidenekanamycin B To a solution of the kanamycin B derivative (1.0 g.), prepared by the procedure described in Example 5, in dimethylformamide (20 ml.), sodium iodide (11 g.) and zinc dust (5 g.) were added and the mixture was heated at 95° C. for 1 hour under vigorous stirring. The mixture was poured into a hot mixture of chloroform (100 ml.) and water (100 ml.) under stirring and the chloroform layer isolated was washed with water, dried over sodium sulfate and evaporated to give a solid (940 mg.). The solid was treated with hot ethyl acetate and the solvent-insoluble solid (310 mg.) was recrystallized from a mixture of methanol-chloroform-ethyl acetate, M.P. 282–284° C., $[\alpha]_D^{22}$+36° (c. 0.4, dimethylformamide); NMR spectrum (in pyridine-$d_5$): $\tau$ 4.06 (2-proton a little broadened singlet, H-3' and 4').

EXAMPLE 7

The synthesis of 2''-O-benzoyl-3',4'-dideoxy-penta-N-ethoxycarbonyl-4'',6''-O-isopropylidenekanamycin B A solution of the kanamycin B derivative (1.15 g.), prepared by the procedure described in Example 6, in a mixture of p-dioxane (45 ml.), methanol (25 ml.) and water (25 ml.) was hydrogenated with hydrogen under 2 atm. pressure in the presence of platinum oxide (0.3 g.), which was preactivated before use, at room temperature for 5 hours. The resulting solution was filtered and evaporated to give a colorless powder, 1.10 g., M.P. 254–256° C., $[\alpha]_D^{22}$ +87° (c. 0.2, dimethylformamide); NMR spectrum (in pyridine-$d_5$): $\tau$ 7.8–8.5 (4-proton broad signal, H-3',4').

EXAMPLE 8

The synthesis of 2''-O-benzoyl-3',4'-dideoxy-penta-N-ethoxycarbonylkanamycin B

The kanamycin B derivative (980 mg.) prepared by the procedure described in Example 7 was dissolved in a mixture of acetic acid (8 ml.) and water (5 ml.) and the solution was heated at 100° C. for 5 minutes. Resulting precipitates were filtered and dried, 750 mg., M.P. 247–248° C., $[\alpha]_D^{23}$ +89° (c. 2.7, dimethylformamide). Found: C, 52.41; H, 6.54; N, 7.48%. Calcd. for $C_{40}H_{61}N_5O_{10}$: C, 52.45; H, 6.71; N, 7.65%.

EXAMPLE 9

The synthesis of 3',4'-dideoxykanamycin B

The kanamycin B derivative (150 mg.), prepared by the procedure described in Example 8, and barium hydroxide octahydrate (2.3 g.) were added to a mixture of water (5 ml.) and P-dioxane (4 ml.), and the resulting mixture was heated in a boiling water bath for 8 hours. Carbon dioxide was introduced and the resulting precipitates were removed by centrifuge. The supernatant layer isolated was evaporated. The residue obtained was dissolved in water and the solution, after filtration, was chromatographed on a column of Amberlite IRC-50 ($H^+$ form) with 0.1–0.4 N ammonium hydroxide. The fraction containing 3',4'-dideoxykanamycin B was concentrated. Addition of acetone gave crystals, 47 mg., $[\alpha]_D^{20}$ +130° (c. 0.65, water). Found: C, 47.71; H, 8.38; N, 15.31%. Calcd. for $C_{18}H_{37}N_5O_8$: C, 47.88; H, 8.26;N,15.51%.

EXAMPLE 10

The synthesis of penta-N-salicylidenekanamycin B

To a suspension of kanamycin B base (400 mg.) in aqueous methanol (1:8, 20 ml.), salicylaldehyde (520 mg.) was added and the resulting solution was poured into water. Precipitates were filtered and dried yielding 750 mg.

EXAMPLE 11

The synthesis of 3',4';4'',6''-di-O-cyclohexylidene-penta-N-salicylidenekanamycin B (in General Formula I', $R=C_6H_4(OH), X=Y=(CH_2)_5C, Z, Z'=H$)

Penta-N-salicylidenekanamycin B (700 mg.) prepared by the procedure described in Example 10 was dissolved in dry dimethylformamide (12 ml.) and the solution, after addition of cyclohexanone dimethylketal (500 mg.) and anhydrous p-toluenesulfonic acid (30 mg.), was heated at 50° C. for 1 hour, and then a small amount of the solvent was removed by evaporation in vacuo. The resulting solution was poured into water. Precipitates occurred were filtered and dried to yield 710 mg.

EXAMPLE 12

The synthesis of 2''-O-benzoyl-3',4';4'',6''-di-O-cyclohexylidene-penta-N-salicylidenekanamycin B (in General Formula I', $R'=C_6H_4(OH), X=Y=(CH_2)_5C, Z=COC_6H_5, Z'=H$)

The kanamycin B derivative (590 mv.) prepared by the procedure described in Example 11 was dissolved in pyridine (10 ml.) and to the solution, benzoyl chloride (120 mg.) was added. After allowing to stand at room temperature for 1 hour, the solution was poured into water. Precipitates occurred were filtered and dried to yield 612 mg.

EXAMPLE 13

The synthesis of 2''-O-benzoyl-4'',6''-O-cyclohexylidene-penta-N-ethoxycarbonylkanamycin B A mixture of the kanamycin B derivative (600 mg.), prepared by the procedure described in Example 12, in aqeuous acetic acid (1:3, 20 ml.) was heated at 95° C. for 30 minutes. The reaction mixture was evaporated and the residue was treated with ether. The ether insoluble part was dissolved in aqueous acetone (1:1, 15 ml.) and to the solution, after addition of anhydrous sodium carbonate (400 mg.), ethoxycarbonyl chloride (270 mg.) was added and stirring was continued for 5 hours at room temperature. Resulting precipitates were filtered, washed with water and dried to give a solid (515 mg.), $[\alpha]_D^{20}$ +98° (c. 1.5, dimethyl-formamide). The substance could be transformed to 3',4'-dideoxykanamycin B by a series of similar procedures described in Examples 5–9.

What we claim is:

1. A process for the synthesis of 3'4'-dideoxykanamycin B which comprises protecting the functional groups of kanamycin B by acylating, alkoxycarbonylating, alkylidenating or arylidenating the amino groups; alkylidenating or arylidenating the 4'' and 6'' hydroxyl groups; acylating, arylmethylating, arylating, alkylsulfonylating or arylsulfonylating the 2'' hydroxyl group, and sulfonylating the 3' and 4' hydroxyl groups of kanamycin B to produce a derivative having disulfonic ester groups; removing the 3', 4'-disulfonic ester groups by reaction with iodide ion and a metal dust having reducing properties in a solvent to produce the 3', 4' unsaturated compound; reducing the 3', 4' unsaturated derivative by catalytic hydrogenation and removing the remaining protective groups to product 3',-4'-dideoxykanamycin B.

2. The method of claim 1 including the step of protecting the 5-hydroxyl group of kanamycin B by acylation.

*3. The compound having the formula*

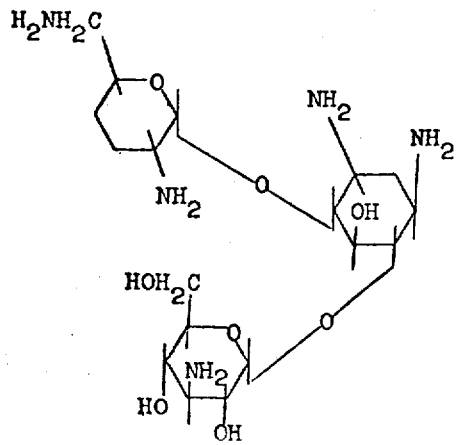

* * * * *